United States Patent Office 3,488,394
Patented Jan. 6, 1970

3,488,394
OXIDATION OF OLEFINIC COMPOUNDS TO GLYCOLS
Richard W. Cummins, Rahway, N.J., assignor to FMC Corporation, New York, N.Y., a corporation of Delaware
No Drawing. Filed May 11, 1966, Ser. No. 549,158
Int. Cl. C07c 29/04
U.S. Cl. 260—617                                    22 Claims

ABSTRACT OF THE DISCLOSURE

Hydroxylation of olefinic compounds to produce polyhydric alcohols by reacting the olefinic compound with a hypochlorite such as sodium hypochlorite in the presence of osmium tetroxide.

---

This invention relates to the oxidation of compounds having carbon-to-carbon unsaturated bonds, to produce alcohols.

The oxidation of olefins to produce polyhydric alcohols by means of cholrate solutions containing osmium tetroxide is well known; Hofmann Ber. 45 3329 (1912); Milas and Terry, J.A.C.S. 47 1412 (1925); Braun, J. Am. Chem. Soc. 51 228 (1929); Waters, Annual Reports on Progress in Chemistry (Chem. Soc. London) 42 152 (1945); Boeseken Rec. trav. Chem. 41 199 (1922); Criegee Ann. 522 75 (1936); Clarke and Owen, J. Chem. Soc. 315 (1949); Zelikoff and Taylor, J. Am. Chem. Soc. 72 5039 (1950); and Posternak and Friedli, Helv. Chim. Acta 36 251 (1953). The use of peroxides together with osmium tetroxide to form polyhydric alcohols from olefins is also known: Milas U.S. Patents 2,414,385 and 2,437,648; Mugdan and Young, J. Chem. Soc. 2988 (1949); Waters in Gilman's Organic Chemistry 1953, vol. IV, pp. 1180–1184; Spring, Annual Reports on Progress in Chemistry (Chem. Soc. London) 40 107 (1943); Smith and Holm, U.S. Patent 2,718,529; Daniels and Fischer, J. Org. Chem. 28 320 (1963); Cope, Fenton and Spence, J. Am. Chem. Soc. 74 5884 (1952); Coscing, Ann. Sci. Univ. Jassy 27 303–326 (1941) in Chem. Abst. 38 2926[2] (1944); Milas and Maloney, J. Am. Soc. 62 1841 (1940); British Patent 730,-431; and German Patent 907,944.

It is one object of this invention to provide a novel, highly efficient and economical method for the production of polyhydric alcohols and other oxidation products from olefins.

Other objects of this invention will be apparent from the following detailed description and claims. In this description and claims, all proportions are by weight, all pressures are atmospheric, and all temperatures are ° C., unless otherwise indicated.

In accordance with one aspect of this invention, an olefin is hydroxylated, preferably to produce a polyhydric alcohol by reacting the olefin with a hypochlorite in aqueous medium in the presence of osmium tetroxide. I have found that this reaction proceeds in the presence of very small amounts of the expensive osmium tetroxide to give high yields of the desired product.

As the olefin there may be employed an olefinic hydrocarbon, which may be cyclic or non-cyclic or an olefinic compound having substituents, such as hydroxyl, chlorine, bromine, iodine, fluorine, cyano, carbonyl, carboxyl, carboxylic ester, etc. Specific examples are given below showing the use of typical olefins such as the alpha-olefins including ethylene, propylene, hexadecene-1 and octene-1, internally unsaturated olefins including cyclohexene and cyclo-octene, and olefins containing non-hydrocarbon substituents, such as allyl alcohol. Other olefins are the alpha- and internally unsaturated olefins of the formula $C_nH_{2n}$ where $n$ is 2 to 20 or more (e.g. isobutylene, or propylene tetramer) cyclic olefins of the formula $C_nH_{2n}-2$ where $n$ is 3 or more (e.g. cyclopentene); cyclic monolefinic compounds having aromatic substituents such as styrene or diphenylethylene; olefinic compounds having several double bonds, in conjugated (e.g. butadiene or cyclopentadiene) or unconjugated arrangement (e.g. Diels-Alder adducts of maleic acid or its esters with butadiene or other conjugated diolefins); substituted olefinic compounds such as oleic and linoleic acids, methyl oleate and other oleic acid esters maleic acid, fumaric acid, diethyl or other dialkyl maleiates and fumarates, crotonic acid and its esters, polymeric esters including glycol maleate polyesters, cinammic acid, acrylonitrile, arcrolein, ketene, allene, halogenated olefins such as vinyl chloride or allyl choride heterocyclic unsaturated compounds such as 2,4-dimethyl-5,6-dihydropyran; unsaturated alcohols and esters of unsaturated alcohols, such as cinammyl alcohol and its esters, other polymeric olefinic compounds such as polybutadiene, polyisoprene, etc. The preferred products are polyhydric alcohols having a pair of alcoholic hydroxyl groups on vicinal carbons; thus, from monoolefinic hydrocarbons such as 1-olefins there obtained 1,2-glycols, from allyl alcohol glycerol is obtained, while from polyolefinic compounds there can be obtained polyhydric alcohols having a plurality of pairs of alcoholic hydroxyls.

The concentration of the osmium tetroxide present may be very small, e.g. in the range of $10^{-5}$ molar, or less, to $10^{-3}$ molar or more. A preferred concentration is about $1 \times 10^{-4}$ to $10 \times 10^{-4}$ molar, based on the combined liquid volume, or in the range of about $1 \times 10^{-4}$ to $1 \times 10^{-2}$ molecules of $OsO_4$ per double bond of the olefin. Larger amounts of $OsO_4$ may be employed, but such amounts are unnecessary and may lead to greater losses of this expensive material. The $OsO_4$ is generally present in solution in the aqueous medium.

The hypochlorite is preferably supplied as an aqueous solution of NaOCl and the amount of hypochlorite is preferably below about 3 molecules, still more preferably about 2 molecules, per reactive olefinic double bond. For best results this amount is about 1 molecule, or less, per reactive olefinic double bond, particularly when the highest yields of the polyhydric alcohols are desired, since higher ratios tend to produce further oxidation of the alcohols to aldehydes and acids. To minimize this tendency it is often useful to add the hypochlorite solution gradually to the olefinic compound. The concentration of NaOCl in the aqueous solution may be relatively high, e.g. 3 molar. For best results the pH of the aqueous system should be at least about 7 to avoid any tendency to unstable HOCl and free chlorine which can lead to chlorination of the olefin by addition of chlorine to the double bond or by substitution (e.g. allylic chlorination). One suitable pH range is about 7 to 13, and preferably about 9 to 11. The NaOCl is in large part converted to NaCl during the reaction.

Best yields are obtained when olefin is present in dissolved condition in the liquid aqueous medium containing the NaOCl and $OsO_4$. Such dissolution is aided, in the case of the usually water-immiscible olefins such as the olefinic hydrocarbons, by the use of a blending agent or co-solvent, e.g. diethyl ether, or alkali metal salts of toluene- or xylene-sulfonic acids. Especially good results are obtained when the co-solvent is tertiary butyl alcohol. The co-solvent chosen is preferably one which is stable under the oxidation conditions. When the water-immiscible olefin is normally gaseous at the reaction temperature, it is desirable to use superatmospheric pressure to bring it into liquid condition. The proportion of co-solvent will depend, of course, on the solubility of the compounds in the liquid mixture. For tertiary butyl alcohol the volume ratio of the alcohol to water is advantageously within the range of about 1:1 to 2:1; a ratio of about 1:1 provides a more uniform reaction mixture. The co-solvent may be present in amount insufficient to dissolve all the olefin present and the reaction system may be a two-phase liquid mixture in which, particularly during agitation, one phase is emulsified in the other, with the reaction probably occurring in the aqueous phase. On dilution with water to lower the electrolyte concentration in the aqueous phase, however, a single phase mixture can be formed, particularly when the olefin is a water-miscible material such as allyl alcohol. An ionic solubilizing agent, or hydrotropic agent, such as an alkyl arylsulfonate (e.g. sodium toluene- or xylene-sulfonate) may be present with the co-solvent to produce a substantially homogeneous single phase aqueous mixture.

It is unnecessary to heat or cool the reaction mixture; excellent results have been obtained at room temperature. The temperature will generally be in the range of about $-10°$ C. to $60°$ C., preferably about 10 to $40°$ C.

When the tertiary butyl alcohol is used as co-solvent, I have found that there is some tendency for allylic chlorination of the olefinic compound to occur (probably by the action of tertiary butyl hypochlorite which forms on contact between the alcohol and the NaOCl solution) and that such chlorination may be prevented by excluding light from the reaction mixture or carrying out the reaction in light from which those wave lengths (e.g. in the ultraviolet region of the spectrum) which are known to promote such chlorination have been screened out.

With some olefinic compounds, such as allyl alcohol, part of the alkyl hypochlorite (formed in situ as mentioned above) adds to the double bond to form an alkyl ether of the corresponding chlorohydrin, e.g. from t-butyl hypochlorite the t-butyl ether,

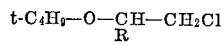

is formed. The desired polyhydric alcohol can be readily recovered from this ether by hydrolysis, preferably under basic conditions, as by simple heating (e.g. at a temperature above about $80°$ C.) with aqueous base (e.g. dilute NaOH, usually of concentration well below 10%, the amount of water present generally being well in excess of the amount stoichiometrically needed for such hydrolysis).

The time of contact of the reactants may be varied, depending on the extent of reaction desired and the temperature. It is within the broad scope of the invention to employ contact times of less than a second to several hours. Very long contact times (e.g. 5 hours at $30°$ C.) can lead to oxidation of the polyhydric alcohols to form aldehydes and acids, possibly by reaction with nascent oxygen (which may be produced by decomposition of NaOCl).

The recovery of the polyhydric alcohols from the reaction mixture can be effected, without loss of the expensive and volatile $OsO_4$ by the addition of a slight excess of the olefinic compound to reduce the $OsO_4$ to $OsO_2$ (or by reaction with excess olefin already present in the mixture), followed by distillation, preferably under vacuum, so that water and co-solvent come off overhead, followed by the polyhydric alcohol, leaving a residue of sodium chloride and $OsO_2$; the latter can be reoxidized by treatment with an oxidizing agent (such as the NaOCl). Before the distillation, the reaction mixture can be extracted with a suitable solvent (e.g. t-butyl alcohol) which will remove the osmium tetroxide and glycol from the sodium chloride. For relatively non-volatile polyhydric alcohols, the osmium can be removed from the polyhydric alcohol by suitable aqueous extraction, as with aqueous NaOCl containing added NaOH.

It is within the scope of this invention to generate the sodium hypochlorite in situ, preferably electrolytically; for example, by passing a current through a solution containing the olefin and sodium chloride (e.g. aqueous sodium chloride solution, emulsified with a co-solvent as previously described). During the electrolysis procedure, the alkalinity of the mixture tends to increase owing to the formation of NaOH (for example, when an alcohol of the formula ROH is present, the reaction may be indicated as

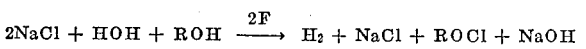

the pH may be maintained substantially constant (preferably below about 11 by the continued addition of an acid, preferably HCl). To reduce polarization of the cathode, a small amount of a depolarizer of known type, e.g. a chromate such as $Na_2Cr_2O_7$, may be included in the reaction mixture.

The reaction may be effected batchwise or continuously with recycle of unreacted materials. For example, in one continuous process the reactants and reaction medium may be fed continuously at a substantially constant rate to a body of agitated two-phase reaction mixture in a reaction zone and reaction mixture may be continuously removed from said body at the same rate; the agitation may be such that reaction mixture being removed has the same composition as the reaction mixture to which the reactants are being added. The effluent from the reaction zone is then separated continuously (as by gravity settling, centrifuging, etc.) into two phases, one an aqueous phase rich in NaOCl and the other an organic solvent phase containing the bulk of the polyhydric alcohol product and $OsO_4$. The aqueous phase may then be enriched continuously with NaOCl and recycled, going directly to the reaction zone; as the concentration of by-product sodium chloride builds up it will precipitate out and may be removed, as by filtration. The solvent phase is treated to reduce the $OsO_4$, as by reaction with added olefin, and the solvent and reduced osmium compound are then separated from the polyhydric alcohol, as by a series of distillations. The solvent then continuously recycled to the reaction zone, and the reduced osmium compound is reoxidized, as by continuous treatment with NaOCl, and also continuously recycled.

Thus, in a continuous process for making propylene glycol, a pressure reactor shielded from light and provided with good agitation is charged with equal volumes of t-butyl alcohol and 2 M sodium hypochlorite at pH 11 plus sufficient $OsO_4$ to make the resulting solution $10^{-4}$ molar in $OsO_4$. While maintaining the temperature at $10\pm5°$ C. and the propylene pressure at 3 atmospheres gage, a mixture of equal volumes of t-butyl alcohol and 2 M sodium hypochlorite at pH 11 is added and the liquid reaction mixture is removed at such a rate that the holdup time in the reactor is between 0.5 and 1.0 hr. The two-phase reaction mixture removed from the reactor is separated, by gravity. The upper t-butyl alcohol layer contains the bulk of the propylene glycol and $OsO_4$ but very little of any unreacted hypochlorite. The lower aqueous phase is reconstituted to 2 M sodium hypochlorite for recycle. As the sodium chloride concentration builds up it precipitates and is removed by filtration. The t-butyl alcohol phase is treated with a little propylene to reduce the osmium and vacuum stripped to remove t-butyl alcohol for recycle. The residual propylene glycol is vacuum distilled to give the finished product. The distillation residue contains the reduced osmium for solution in 2 M sodium hypochlorite for recycle.

The following examples are given to illustrate this invention further:

EXAMPLE 1 t-Butyl alcohol (109 ml.), 13.60 ml. (0.20 mole) allyl alcohol and 1.0 ml. ($8\times10^{-5}$ mole) of a 0.079 molar aqueous solution of $OsO_4$ was placed in a 500-ml., round-bottomed, one-necked Pyrex flask equipped with thermowell, magnetic stirrer, and vented addition funnel. The flask was covered to exclude light and immersed in a water bath maintained at $30°$. Sodium hypochlorite, 109 ml. (0.20 mole) of 1.83 molar solution of pH 9.7, was added in two minutes. An exothermic reaction occurred during the first 5 minutes with temperature rising to 36°. The reaction mixture, which was continuously stirred, was a yellow emulsion which remained unchanged in appearance during the 3.1 hour reaction period. At termination, the mixture consisted of an upper colorless alcohol phase and a lower deep clear yellow aqueous phase. It was diluted to 500 ml. with water yielding a clear yellow solution of pH 9.3 which contained hypochlorite amounting to 0.5% of that charged, allyl alcohol amounting to 31.4% of that charged, and glycerol amounting to 53.6% of theory based on allyl alcohol charged or 78.1% based on allyl alcohol consumed. Glycerol yield was increased to 97.8%, based on allyl alcohol consumed, on heating for 2 hours at 100° after adding an amount of sodium hydroxide such as to maintain the pH at 12.2, to effect a sodium-hydroxide-catalyzed hydrolysis.

EXAMPLE 2

Example 1 was repeated, except that the t-butyl alcohol was omitted; the reaction was effected in room light in a 600 ml. beaker while stirring; the sodium hypochloride solution (2.19 ml., 0.40 mole of 1.83 molar solution) was mixed first with 1.0 ml. ($8 \times 10^{-5}$ mole) of aqueous 0.079 molar $OsO_4$ and the allyl alcohol (27.2 ml., 0.40 mole) was added thereto gradually over a period of 17 minutes. The pH was maintained at 10-11 by addition of 4M NaOH as required. After a total reaction period of 31 minutes, and dilution with water as in Example 1, the clear yellow solution contained glycerol amounting to 88% of theory based on allyl alcohol consumed. The amount of allyl alcohol consumed was 81% of that charged. Hydrolysis as in Example 1 increased the glycerol yield to 91% of theory, based on allyl alcohol consumed.

EXAMPLE 3 t-Butyl alcohol (108 ml.), 108 ml. (0.20 mole) of 1.85 molar sodium hypochlorite (pH 10), and 1.0 ml. ($8 \times 10^{-5}$ mole) of .079 molar $OsO_4$ was placed in a 500-ml., round-bottomed, one-necked Pyrex flask equipped with thermowell, magnetic stirrer, propylene inlet tube and rotometer for measuring propylene flow rate. The flask was covered to exclude light and immersed in a bath at 30°. The vapor space was purged with propylene for 5 minutes and a propylene pressure of 35 p.s.i.g. applied. The mixture was stirred rapidly to maintain an emulsion for 3 hours. The propylene glycol yield was 76% based on hypochlorite charged and 99% based on hypochlorite consumed.

EXAMPLE 4

Octene-1 was subjected to hypochlorite oxidation using the conditions described in Example 1 for allyl alcohol. 1,2-octanediol was obtained in 62% yield based on octene charged and in 100% yield based on octene consumed.

EXAMPLE 5

Cyclohexene was oxidized by hypochlorite under the conditions used in Example 1 for allyl alcohol. Unlike the reaction of Example 1, the reaction here was not exothermic. cis-1,2-Cyclohexanediol was obtained in 41% yield based on cyclohexene charged and in 65% yield based on cyclohexene consumed. An oil which separated from the reaction mixture was identified as 3-chlorocyclohexene by infrared spectroscopy and qualitative tests for unsaturation and allylic chlorine, the yield of this oil was about 37% based on cyclohexene charged.

EXAMPLE 6

Cyclooctene was oxidized by hypochlorite, using the conditions described in Example 1 for allyl alcohol, to give cis-1,2-cyclo-octanediol in 51% yield based on hypochlorite charged and 89% yield based on hypochlorite consumed. cis-1,2-cyclooctanediol was isolated, by ether extraction from the alkaline reaction mixture, as a white crystalline solid M.P. 74–76°. The reported melting point of cis-1,2-cyclooctanediol is 77.5–79°.

*Analysis.*—Calc'd for $C_8H_{16}O_2$: C, 66.63; H, 11.18. Found: C, 66.92; H, 10.80.

EXAMPLE 7

Propylene was oxidized according to the procedure of Example 3, except that the co-solvent used was diethyl ether, the reaction temperature was 20°, and the reaction was carried out in room light. The yield of propylene glycol was 60% of the theoretical, based on the amount of NaOCl charged.

EXAMPLE 8

A solution containing 15 grams of glycerol in 200 ml. of 2 molar aqueous sodium chloride solution containing 0.01 gram of $OsO_4$, 0.08 gram of NaOH and 0.86 gram of allyl alcohol was first distilled at a pressure of 20 mm. Hg A. (at temperatures up to 80°); the distillate was free of osmium. The residue was then distilled at 1 mm. Hg A. and 150°; an osmium-free distillate containing 14.7 grams of glycerol was obtained.

EXAMPLE 9

A current was passed through an electrolytic cell comprising a pair of 2 x 2-inch bright platinum foil electrodes facing each other and spaced 20 mm. apart, fully immersed in a mixture of 500 ml. of aqueous 4 M sodium chloride solution, 250 ml. of t-butyl alcohol, 1 g. $K_2CrO_4$ (a cathode depolarizer), 1.9 ml. of aqueous 0.079 M $OsO_4$ and 7.83 ml. (0.05 mole) of octene-1. During the electrolysis, a potential of 6 volts was applied across the electrodes; the current density was 0.06 amp cm.$^{-2}$. The electrolysis was continued until the total current was equivalent to that theoretically needed to produce 0.054 mole of NaOCl (about 1 hour). During the electrolysis, the cell was in very dim light; aqueous 1 N hydrochloric acid was added as required to maintain the pH at 8; the cell was maintained at a temperature of 10° C.; and the contents were continuously stirred. The yield of 1,2-octanediol (as measured by analysis with periodic acid) was substantially quantitative based on the amount of octene consumed, which was about 23% of that charged.

EXAMPLE 10

Sodium hypochlorite (1.00 mole, 314 ml. of 3.185 M solution), 157 ml. of t-butyl alcohol and 2.30 ml. of 0.079 M $OsO_4$ were placed in a reactor equipped with magnetic stirrer, thermometer and addition funnel. The flask was covered with aluminum foil to exclude light. A solution of 286 ml. (1.00 mole) of hexadecene-1- in 157 ml. of t-butyl alcohol was added within 10 minutes while stirring vigorously and maintaining the temperature at 20°. The stirring was continued for a total of 19 hours at 20°. At the end of this time, the reaction mixture consisted of soft white curds in a yellow liquid. t-Butyl alcohol (267 ml.) and 257 ml. of water was added to the mixture to give two clear layers—an upper yellow alcohol layer and a lower colorless aqueous layer. The alcohol layer was separated and the aqueous layer extracted with t-butyl alcohol and the extracts added to the main alcohol layer giving a total volume of 1010 ml. The resulting hypochlorite-free solution contained 100.5 g. of hexadecene-1 (44.8% recovery) and 141.9 g. of 1,2-hexadecanediol (54.9% yield based on hexadecene-1-charged or 99.5% yield based on hexadecene-1 consumed) as determined by periodic acid analysis.

The alcohol solution was vacuum stripped at 20 mm. Hg A. and 60° to give an amber slush which was slurried with 1150 ml. of hexane for 1 hour; the slurrying and filtering was repeated twice more after which the filter cake was dissolved in 1010 ml. of warm t-butyl alcohol and extracted twice with 220 ml. of 0.8 M sodium hypochlorite and 15 ml. of 4 M sodium hydroxide and the alcohol phase dried over anhydrous magnesium sulfate, filtered and vacuum stripped at 20 mm. and 80°. The 1,2-hexadecanediol product was a friable white solid M.P. 72–74° giving a negative test for osmium.

EXAMPLE 11

(a) Sodium hypochlorite in 2.8 M aqueous solution was added gradually over a 2 minute period to a stirred homogeneous aqueous solution containing octene-1, t-butyl alcohol, water, sodium p-toluenesulfonate, and osmium tetroxide at 30° in the dark. The amounts of the ingredients were

| | |
|---|---|
| 2.80 molar sodium hypochlorite (0.10 mole) ml | 35.5 |
| Octene-1 (0.10 mole) ml | 15.7 |
| T-butyl alcohol ml | 15.7 |
| 40% aqueous sodium toluenesulfonate solution of pH 10.0 ml | 78.5 |
| $OsO_4$ g | 0.030 |

The solution remained homogeneous throughout the reaction. 1,2-Octanediol was formed in a yield of 86% based on the amount of octene charged.

(b) Example 11(a) was repeated except that the NaOCl was supplied in 3 M solution, the volume ratio of the reaction mixture (prior to NaOCl addition) to added NaOCl solution was 2.4 and the reaction was carried out in the light.

(c) Example 11(a) was repeated except that sodium xylene sulfonate was used in place of the sodium toluene sulfonate, the NaOCl was supplied in 2.9 M solution, the volume ratio of reaction mixture (prior to NaOCl addition) to added NaOCl solution was 4.7, and the mole ratio of NaOCl to octene was 0.5.

EXAMPLE 12

To 78.5 ml. of t-butyl alcohol in a 250 ml. Pyrex stirred reactor was added 11.2 g. (0.10 mole) of octene-1, 0.72 ml. of 0.079 M $OsO_4$ and 5.3 ml. of 50% NaOH (0.10 mole). To the resulting deep yellow emulsion at 30° was added 47.4 ml. of 2.11 M t-butyl hypochlorite (0.10 mole) (in t-butyl alcohol solution) in 10-ml. portions over an 18 minute period. The light yellow emulsion was stirred at 30° for 2 hours and the resulting white suspension of NaCl in a yellow solution was filtered to remove NaCl. Analysis of the clear yellow filtrate indicated a 37% yield of octanediol based on octene-1 charged or a 56% yield based on octene-1 consumed.

It is within the broad scope of the invention to use other hypochlorites, e.g. inorganic hypochlorites such as calcium, lithium, potassium or barium hypochlorite which typify the alkali metal and alkaline earth metal hypochlorites, or organic hypochlorites including hypochlorite esters, e.g. esters of alcohols such as t-butyl hypochlorite, or hypochlorites formed by hydrolysis of organic N-chloramines or N-chloroamides. In fact, at a pH below 9, the hypochlorite, in a composition made by mixing aqueous NaOCl and t-butyl alcohol, is largely present in the form of t-butyl hypochlorite. This transfer of hypochlorite also occurs with other alcohols, e.g. allyl alcohol.

It is to be understood that the foregoing detailed description is given merely by way of illustration, and that variations may be made therein without departing from the spirit of this invention.

What is claimed is:

1. Process for the oxidation of olefinic compounds in which the olefinic compound is reacted in aqueous medium at a pH of at least 7 in the presence of osmium tetroxide with a hypochlorite of an alkali metal or alkaline earth metal at a temperature of about −10 to 60° C. to form primarily a dihydroxy addition product of said olefinic compound, said olefinic compound being selected from the group consisting of olefinic hydrocarbons and hydroxyl-substituted olefinic hydrocarbons.

2. Process as in claim 1 in which the pH is 7 to 13.

3. Process as set forth in claim 1 in which a catalytic amount of the osmium tetroxide, in a concentration in the range of about $10^{-5}$ to $10^{-3}$ molar, is present.

4. Process as set forth in claim 1 and including the step of recovering from the resulting reaction mixture a polyhydric alcohol produced by said process, said polyhydric alcohol having a pair of alcoholic hydroxyl groups on vicinal carbon atoms.

5. Process at set forth in claim 4 in which the olefin is an alpha-olefin of the formula $C_nH_{2n}$, where $n$ is at least two.

6. Process as set forth in claim 4 in which the olefin is a cyclic olefin of the formula $C_nH_{2n}$ where $n$ is at least three.

7. Process as set forth in claim 4 in which the olefin is allyl alcohol, and said polyhydric alcohol is glycerol.

8. Process as set forth in claim 5 in which the olefin is propylene and said polyhydric alcohol is propylene glycol.

9. Process as set forth in claim 5 in which the olefin is a higher aliphatic olefin.

10. Process as set forth in claim 1 in which the aqueous medium also contains a tertiary alkyl hypochlorite.

11. Process as set forth in claim 1, in which the hypochlorite is formed in situ by electrolytic anodic oxidation of a chloride.

12. Process as set forth in claim 11 in which the chloride is sodium chloride.

13. Process as set forth in claim 1 in which preformed sodium hypochlorite is mixed with said olefin.

14. Process as set forth in claim 13 in which the amount of said hypochlorite is at most about one molecule per reactive double bond of said olefin.

15. Process as set forth in claim 1 in which the reaction is effected in the presence of a solvent having a greater degree of water-miscibility than said olefin.

16. Process as set forth in claim 1 in which the reaction is effected in the presence of t-butyl alcohol.

17. Process as set forth in claim 15 in which the reaction mixture has an aqueous phase and a solvent phase immiscible with said aqueous phase and containing the olefin.

18. Process as set forth in claim 15 in which the reaction mixture contains a solubilizing agent and is a substantially single phase mixture.

19. Process as in claim 1 in which the pH is about 9 to 11 a catalytic amount of osmium tetroxide, in a concentration in the range of about $10^{-5}$ to $10^{-3}$ molar, is present, the temperature is in the range of about −10 to 60° C., to produce directly a polyhydric alcohol having a pair of alcoholic hydroxyl groups on those vicinal carbon atoms which were joined by the double bond of said olefin.

20. Process as in claim 1 for the continuous production of propylene glycol by continuously feeding propylene at superatmospheric pressure, and aqueous sodium hypochlorite, to a reaction zone containing a catalytic proportion of osmium tetroxide, forming an aqueous multiphase reaction mixture comprising aqueous sodium hypochlorite and propylene glycol in said reaction zone, separating an aqueous sodium hypochlorite phase from said reaction mixture and recovering propylene glycol from the balance of said reaction mixture.

21. Process as in claim 20 in which the pH is about 9 to 11, the osmium tetroxide concentration is about $10^{-5}$ to $10^{-3}$ molar, the temperature is about 5 to 40° C., and the concentration of sodium hypochlorite in the aqueous phase is 2 to 3 molar.

22. Process as in claim 21 in which the multiphase mixture contains t-butyl alcohol in amount of about 1 to 2 volumes per volume of water and the reaction is effected in the dark.

References Cited

UNITED STATES PATENTS

| | | | |
|---|---|---|---|
| 2,106,353 | 1/1938 | Langeduk | 260—634 |
| 2,107,789 | 2/1938 | Harford | 260—634 |
| 2,260,547 | 10/1941 | Valik | 260—634 |
| 2,282,683 | 5/1942 | Tamela et al. | 260—636 |
| 2,437,648 | 3/1948 | Milas | 260—635 |
| 2,541,091 | 2/1951 | Oroshnik | 260—636 |
| 2,773,101 | 12/1956 | Smith et al. | 260—635 |
| 2,813,130 | 11/1957 | Keeler et al. | 260—635 |
| 3,317,592 | 5/1967 | MacLean et al. | 260—635 |
| 3,337,635 | 8/1967 | Norton et al. | 260—635 |

FOREIGN PATENTS

| | | |
|---|---|---|
| 512,182 | 8/1939 | Great Britain. |
| 889,613 | 2/1962 | Great Britain. |

OTHER REFERENCES

Sconce, "Chlorine," (1962), pp. 35, 39, 82.

LEON ZITVER, Primary Examiner

J. E. EVANS, Assistant Examiner

U.S. Cl. X.R.

204—78, 79, 80; 260—75, 94.7, 345.9, 453, 465.6, 484, 521, 523, 530, 533, 535, 599, 602, 604, 615, 618, 631, 633, 635, 649

UNITED STATES PATENT OFFICE
CERTIFICATE OF CORRECTION

Patent No. 3,488,394　　　　　　　Dated January 6, 1970

Inventor(s) Richard W. Cummins

It is certified that error appears in the above-identified patent and that said Letters Patent are hereby corrected as shown below:

Column 1, line 43, "Am. Soc." should read --Am. Chem. Soc.--.

Column 3, line 37, "poyhydric" should read --polyhydric--.

Column 4, line 6, "NaOH" should read --NaOH;)--.

Column 8, line 18, "$C_nH_{2n}$" should read --$C_nH_{2n-2}$--.

SIGNED AND
SEALED
FEB 9

FEB. 9, 1971

(SEAL)
Attest:

Edward M. Fletcher, Jr.
Attesting Officer

WILLIAM E. SCHUYLER, JR.
Commissioner of Patents